Patented June 2, 1953

2,640,790

UNITED STATES PATENT OFFICE 2,640,790

COATED PAPER AND PROCESS FOR MAKING SAME

Edwin J. Barber, Newport, Del., assignor to Hercules Powder Company, Wilmington, Del., a corporation of Delaware No Drawing. Application October 26, 1949, Serial No. 123,789

3 Claims. (Cl. 117—157)

This invention relates to a coated paper and process useful therefor.

In the prepartion of a coated paper, it is conventional to prepare a mixture of water and a pigment such as clay or the like, optionally together with other materials such as, for example, a soluble pyrophosphate which may act as a dispersing and stabilizing agent. This mixture, otherwise known as a pigment slip or, since it generally contains clay, as a clay slip, is then compounded with a binder or adhesive material to produce a composition known in the art as a coating color which is useful for coating a cellulose web. Considerable quantities of the binder are used, and, accordingly, the composition and characteristics of the binder are of great importance in determining the qualities of the finished paper. Important properties of the binder are that it must impart to the coacting color or to the finished paper a high degree of brightness, smoothness and gloss, and a good finish and feel after calendering. In addition to these basic qualities required in coatings, there are various further characteristics that go far toward determining the value and utility of coating adhesives: (1) the coating color must flow smoothly and evenly so that it may be applied to paper at sufficiently high speeds to be economical in ordinary coating processes; (2) the coating must have high strength, to permit subsequent printing on the coated paper without "picking"; and (3) the coating must have a high wet-rub resistance for uses wherein the coated paper is treated with water as, for example, in off-set printing. It has previously been difficult to find a satisfactory adhesive or binder which is favorably adapted for these critical needs and which, at the same time, is economically available.

There may be prepared a coating composition comprising a pigment or a clay slip with a binding material, the binding material being a water-soluble derivative of a cellulose alkyl ether sulfonic acid such as, for example, an alkali salt of cellulose ethyl ether $\beta$-sulfonic acid. According to one particular embodiment of the invention, sodium cellulose ethyl ether $\beta$-sulfonate is the binding material and the following examples specifically showing the operability of this material are presented in illustration of the invention but not in limitation thereof.

Example 1

A 70% clay slip was prepared by mixing 100 parts of pulverized clay with the required quantity of water and adding 0.5% sodium pyrophosphate based on the clay. Into the clay slip thus prepared, 9 parts of sodium cellulose ethyl ether $\beta$-sulfonate in the form of a 12.5% solution was readily blended, requiring only a small amount of stirring to give a smooth color. The color, with a pH of approximately 8–8.5, was then adjusted to a solids content of 44–52% and the mixture was passed through a 60-mesh screen to insure the absence of undispersed clay agglomerates. The screened coating color was then coated on mill-made coating base stock and the coated sheets were air-dried at room temperature, conditioned at 75% relative humidity and supercalendered. Test sheets were selected from the air-dried coated paper and were conditioned for two days at 23–24° C. and 50% relative humidity and then tested according to standard Dennison wax tests and a bonding strength test in comparison with a control sheet containing 20% commercial starch as the binder. The test sheets prepared according to this invention were comparable or superior to the control sheet in tests indicating printing performance.

Example 2

The procedure of Example 1 was followed except that the coating composition was adjusted to a higher solids ratio with the result that the sheets contained 12% binder based on the clay. The test sheets were conditioned as before and then subjected to the standard Dennison wax test and the bonding strength test as in Example 1. The printing performance of the test sheets was superior to that of control sheets containing 20% starch as a binder.

The coated paper resulting from the procedure of this example was characterized by excellent color, brightness and finish, and had good printing properties as indicated by satisfactory Dennison wax tests.

The coating color composition comprises an aqueous mixture of a pigment or a clay slip with a binding material, the binding material being a water-soluble salt of a cellulose alkyl ether sulfonic acid. Although the potassium, ammonium, barium and calcium salts are operable in this invention, the sodium salt of cellulose ethyl ether $\beta$-sulfonic acid is preferred. For optimum results in the coating of paper, it is preferred to prepare a coating color having a total solids composition which is relatively high, thus providing good surface coating quality and economical operation. A preferred range of total solids for the coating color is between about 30 and 65% solids with an optimum value at about 40–55%.

The amount of the binder in the coating color is maintained between about 5 and about 15% based on the weight of clay and preferably between 8 and 12%. A composition containing an amount of total solids and binder in this range is characterized by being readily applied to the surface of the paper and by forming a highly resistant coating thereon. Utilizing the coating color according to this invention, there is produced a coated paper with highly satisfactory primary qualities such as color, brightness, smoothness, gloss and the like and which is highly satisfactory for use in printing operations and is resistant to disturbance of the clay coating surface through rubbing, picking, and the like.

The pigment material which is utilized in the coating color comprises one of the conventional paper coating materials such as, for example, a pulverized clay or the like. For higher quality or special types of paper there may be substituted therefor other known pigment materials such as, for example, calcium carbonate, titanium dioxide, satin white or other coating pigments alone, or preferably with a clay base. The modification of the coating color using these materials will be within the knowledge of those skilled in the art and it is to be understood that the pigment material as contemplated herein includes any or all of these materials.

The utility of applicant's invention is not limited to the particular type of paper pulp used, and, accordingly, applicant's invention may be utilized with the various types of kraft, soda, sulfite pulp, and the like as well as with various other chemical and semichemical paper pulps. By the same token, the invention may be utilized with various types of paper products such as paper, fiberboard, molded pulp products, and the like. In all instances, the product produced by applicant's invention is characterized by being relatively resistant to abrasion and by having a surface of fine quality and improved printing properties.

What I claim and desire to protect by Letters Patent is:

1. The process for preparing a coated paper of the type having a base of cellulosic fibers and a printing surface consisting essentially of a film of contiguous pigment particles interspersed in binder by means of which the pigment particles are bound together and are retained on the base comprising dispersing a pigment in an aqueous solution of a binder consisting essentially of a water-soluble metal salt of a cellulose ethyl ether $\beta$-sulfonic acid to form a viscous coating color having from about 30% to about 65% total solids and having said binder present in the amount of between about 5% and about 15%, based on the weight of the pigment, covering a web of said paper with a coating of said viscous coating color, and drying the paper to form a coated paper having excellent receptivity to printing.

2. The process for preparing a coated paper of the type having a base of cellulosic fibers and a printing surface consisting essentially of a film of contiguous pigment particles interspersed in binder by means of which the pigment particles are bound together and are retained on the base comprising dispersing a pigment in an aqueous solution of a binder consisting essentially of a water-soluble sodium cellulose ethyl ether $\beta$-sulfonate to form a viscous coating color having from about 30% to about 65% total solids and having said binder present in the amount of between about 5% and about 15%, based on the weight of the pigment, covering a web of said paper with a coating of said viscous coating color, and drying the paper to form a coated paper having excellent receptivity to printing.

3. A coated paper produced by the process of claim 1.

EDWIN J. BARBER.

References Cited in the file of this patent

UNITED STATES PATENTS

| Number | Name | Date |
|---|---|---|
| 1,682,293 | Lilienfeld | Aug. 28, 1928 |
| 2,373,933 | Weeks | Apr. 17, 1945 |
| 2,422,000 | Dickey et al. | June 10, 1947 |
| 2,425,768 | Wagner | Aug. 19, 1947 |
| 2,441,927 | Adams | May 18, 1948 |

FOREIGN PATENTS

| Number | Country | Date |
|---|---|---|
| 480,679 | Great Britain | Feb. 24, 1938 |